(12) United States Patent
Czajkowski et al.

(10) Patent No.: US 6,522,647 B1
(45) Date of Patent: Feb. 18, 2003

(54) ENHANCED VODSL SERVICE PROVISION

(75) Inventors: Igor K Czajkowski, Bishop's Stortford (GB); Leslie Humphrey, Harlow (GB); Brian Michael Unitt, Bishop's Stortford (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/375,759

(22) Filed: Aug. 18, 1999

(51) Int. Cl.[7] .............................................. H04L 12/66
(52) U.S. Cl. ...................................................... 370/356
(58) Field of Search ................................ 370/354, 248, 370/356, 401, 942, 352, 468–489, 237, 395–398; 709/249, 208–211; 379/93.23–93.26, 219, 9–27, 88.13; 455/433–445, 460

(56) References Cited

U.S. PATENT DOCUMENTS

| | | | | |
|---|---|---|---|---|
| 5,594,727 A | * | 1/1997 | Kolbenson et al. | 370/442 |
| 5,940,759 A | * | 8/1999 | Lopez-Torres et al. | 455/433 |
| 5,991,292 A | * | 11/1999 | Focsaneanu et al. | 370/352 |
| 6,044,403 A | * | 3/2000 | Gerszberg et al. | 709/225 |
| 6,118,777 A | * | 9/2000 | Sylvain | 370/351 |
| 6,118,856 A | * | 9/2000 | Paarsmarkt et al. | 379/93.24 |
| 6,226,362 B1 | * | 5/2001 | Gerzberg et al. | 379/88.13 |
| 6,272,209 B1 | * | 8/2001 | Bridger et al. | 379/27 |

OTHER PUBLICATIONS

Greg Langdon, "Voice over DSL Sounds Promising", Aug. 5, 1999, CNN.com, pp. 1–4.*

* cited by examiner

Primary Examiner—Kwang Bin Yao
Assistant Examiner—Prenell Jones
(74) Attorney, Agent, or Firm—Lee, Mann, Smith, McWilliams, Sweeney & Ohlson

(57) ABSTRACT

An equipment architecture for Voice over Digital Subscriber Line (VoDSL) equipment is provided, along with related methods of operation. A Digital Access System (DAS) Customer Premises Equipment (CPE) is provided comprising: an internal packet switched network comprising a switch; a DAS modem connected to the internal network and arranged such that in use the internal network is coupled to an external packet switched network by a DAS link over an access network; a network-telephony interface connected to the internal network and coupled to a customer premises telephony appliance; a network-data interface connected to the internal network and coupled to a customer premises data appliance; a controller arranged to control the switch in order to establish packet transfer paths between the modem and the interfaces to complete calls between the appliances and entities on the external network; and equipment for transferring service messages across the internal network between the interfaces, the controller and the modem.

24 Claims, 5 Drawing Sheets

ENHANCED VODSL SERVICE PROVISION

Reference is made to applicants co-pending applications of the same date and titled "Improved VoDSL Service Provision" (our reference 10868ID: Czajkowski) and "Enhanced Performance VoDSL" (our reference 10880ID: Czajkowski). The contents of these applications are intended to be incorporated herein.

FIELD OF THE INVENTION

The present invention relates to communications access networks, and in particular to Voice-over Digital Subscriber Line customer premises equipment and services provision.

BACKGROUND OF THE INVENTION

Telephone access networks have historically always been connection orientated, typically using dedicated copper wire circuits between subscribers and the exchange or central office. Typically these access networks were designed to carry only voice with a bandwidth of less than 4 kHz. However in recent years with the growth of the internet and demand for other multi-media services such as video-on-demand and video conferencing, subscribers of telephone companies have demanded additional bandwidth over the access network to provide adequate internet and multi-media services access.

The Integrated Services Digital Network (ISDN) protocol was developed as an access network architecture for delivering all types of services including voice, data and video for example. Although ISDN provides a single access technology, it is limited by offering only "narrow band" communications speeds and relatively high pricing for terminal equipment and network access. This, together with the lack of "imaginative" residential services that could capitalize on the underlying bandwidth capacity, has seen the technology being confined to larger business customers.

Digital Subscriber Line (DSL) modem technology has enabled the transmission of digital information at duplex rates from 144 Kbits/s to over 1 Mbits/s over the local subscriber loop consisting of unshielded twisted pair cable. Reference is made to IEE Electronics Communication Engineering Journal, Vol.11, No. 3, Page 125 (June 1999) for additional background on DSL technology. The demand for additional telephone lines and integrated telephony and data services has given rise to voice-over DSL (VoDSL) solutions, which use modem technologies to deliver services in-band over a single physical line. For example, a VoDSL offering may provide a Customer Premises Equipment (CPE) functionality with 4 POTS (Plain Old Telephony Service) ports, each with a unique telephone number, and an ethernet port for high speed data access to an Internet Service Provider (ISP). All the POTS (typically voice or fax conduits) lines are provided as digitally derived services. VoDSL is an emerging technology, and as such requires subscriber acceptance and take-up both for the future development of this technology and to repay access network operator investment in the VoDSL equipment.

SUMMARY OF THE INVENTION

It is an object of the present invention to provide improved VoDSL customer premises equipment functionality.

It is a further object of the present invention to provide the subscriber of VoDSL access networks with improved services capability.

In a first aspect the present invention provides a Digital Access System (DAS) Customer Premises Equipment (CPE) comprising: an internal packet switched network comprising a switch; a DAS modem connected to said internal network and arranged such that in use the internal network is coupled to an external packet switched network by a DAS link over an access network; a network-telephony interface connected to said internal network and coupled to a customer premises telephony appliance; a network-data interface connected to said internal network and coupled to a customer premises data appliance; a controller arranged to control said switch in order to establish packet transfer paths between said modem and said interfaces to complete calls between said appliances and entities on the external network; and means for transferring service messages across said internal network between said interfaces, said controller and said modem.

Preferably said DAS is Voice over Digital Subscriber Line (VoDSL).

Preferably said means comprises means for transferring control and information signals between said controller and a computing function in order to adapt the controller to provide alternative packet transfer paths for said service messages.

Preferably said means comprises an application programmers interface enabling function corresponding to an application programmers interface enabling function in said computer function which together form an application programmers interface (API) between said means and said computer function over which said signals are transferred.

Preferably said CPE comprises said computing function.

Alternatively said computing function is external to said CPE

Preferably said computing function is associated with a Personal Computer connected to said network-data interface.

Preferably said API is formed across said interface.

Preferably said switch is a multicasting switch.

Preferably said internal network is an ATM network.

Preferably said data appliance comprises a Personal Computer.

Preferably said service messages comprise text messages and control signals according to the ADSI specification.

Preferably said telephony appliance comprises an ADSI telephone.

In a second aspect the present invention comprises a system comprising a DAS CPE, a customer premises data appliance connected to said CPE, a customer premises telephony appliance connected to said CPE, wherein said CPE is connected in use to an access network, and wherein said DAS comprises: an internal packet switched network comprising a switch; a DAS modem connected to said internal network and arranged such that in use the internal network is coupled to an external packet switched network by a DAS link over said access network; a network-telephony interface connected to said internal network and coupled to said customer premises telephony appliance; a network-data interface connected to said internal network and coupled to said customer premises data appliance; a controller arranged to control said switch in order to establish packet transfer paths between said modem and said interfaces to complete calls between said appliances and entities on the external network; and means for transferring service messages across said internal network between said interfaces, said controller and said modem.

Preferably said DAS is VoDSL.

Preferably said means comprises means for transferring control and information signals between said controller and a computing function in order to adapt the controller to provide alternative packet transfer paths for said service messages.

Preferably said service messages comprise text messages and control signals according to the ADSI specification.

Preferably said telephony appliance comprises an ADSI telephone.

In a third aspect the present invention provides a method of operating a VoDSL CPE to provide enhanced calling line identifier information, said CPE comprising: an internal packet switched network comprising a switch; a DSL modem connected to said internal network and arranged such that in use the internal network is coupled to an external packet switched network by a DSL link over an access network; a network-telephony interface connected to said internal network and coupled to a customer premises telephony appliance; a network-data interface connected to said internal network and coupled to a customer premises data appliance; a controller arranged to control said switch in order to establish packet transfer paths between said modem and said interfaces to complete calls between said appliances and entities on the external network; and means for transferring service messages across said internal network between said interfaces, said controller and said modem; said method comprising: receiving an incoming call for said telephony appliance; receiving incoming caller identity information from said call; routing said information to said data appliance; receiving service messages from said appliance which contain enhanced calling line identifier information; forwarding said service messages to said telephony appliance in order to display said enhanced information to a user of said appliance.

In a further aspect the present invention provides a method of operating a VoDSL CPE to provide internal calling services, said CPE comprising: an internal packet switched network comprising a switch; a DSL modem connected to said internal network and arranged such that in use the internal network is coupled to an external packet switched network by a DSL link over an access network; a first and second network-telephony interface connected to said internal network and coupled to a first and second customer premises telephony appliance respectively; a network-data interface connected to said internal network and coupled to a customer premises data appliance; a controller arranged to control said switch in order to establish packet transfer paths between said modem and said interfaces to complete calls between said appliances and entities on the external network; and means for transferring service messages across said internal network between said interfaces, said controller and said modem; said method comprising: receiving an outgoing call from said first telephony appliance; determining whether the called party is said second telephony appliance; routing said call to said second telephony appliance.

Preferably the method further comprises: determining whether said second telephony appliance is engaged in another call; forwarding a service message to said second telephony appliance indicating that said first telephony appliance is calling.

In a yet further aspect the invention provides method of operating a VoDSL CPE to provide an e-mail alert service, said CPE comprising: an internal packet switched network comprising a switch; a DSL modem connected to said internal network and arranged such that in use the internal network is coupled to an external packet switched network by a DSL link over an access network; a network-telephony interface connected to said internal network and coupled to a customer premises telephony appliance; a network-data interface connected to said internal network and coupled to a customer premises data appliance; a controller arranged to control said switch in order to establish packet transfer paths between said modem and said interfaces to complete calls between said appliances and entities on the external network; and means for transferring service messages across said internal network between said interfaces, said controller and said modem; said method comprising: receiving service messages from said data appliance which contain an indication that said appliance has received an email; forwarding said service messages to said telephony appliance in order to display said indication to a user of said appliance.

In another aspect the present invention provides a method of operating a VoDSL CPE to provide a modem state diagnosis service, said CPE comprising: an internal packet switched network comprising a switch; a DSL modem connected to said internal network and arranged such that in use the internal network is coupled to an external packet switched network by a DSL link over an access network; a network-telephony interface connected to said internal network and coupled to a customer premises telephony appliance; a network-data interface connected to said internal network and coupled to a customer premises data appliance; a controller arranged to control said switch in order to establish packet transfer paths between said modem and said interfaces to complete calls between said appliances and entities on the external network; and means for transferring service messages across said internal network between said interfaces, said controller and said modem; said method comprising: receiving service messages from said appliances which contain modem state information requests and forwarding said messages to said modem; receiving service messages from said modem which contain modem state information and forwarding to said appliances.

Preferably the method further comprises: receiving service messages from appliances which contain control instructions for said modem and forwarding said messages to said modem.

BRIEF DESCRIPTION OF THE DRAWINGS

In order that a greater understanding of the invention can be obtained, embodiments of the invention will now be described with reference to the accompanying drawings, by way of example only and without intending to be limiting, in which.

DETAILED DESCRIPTION

Figure 1:
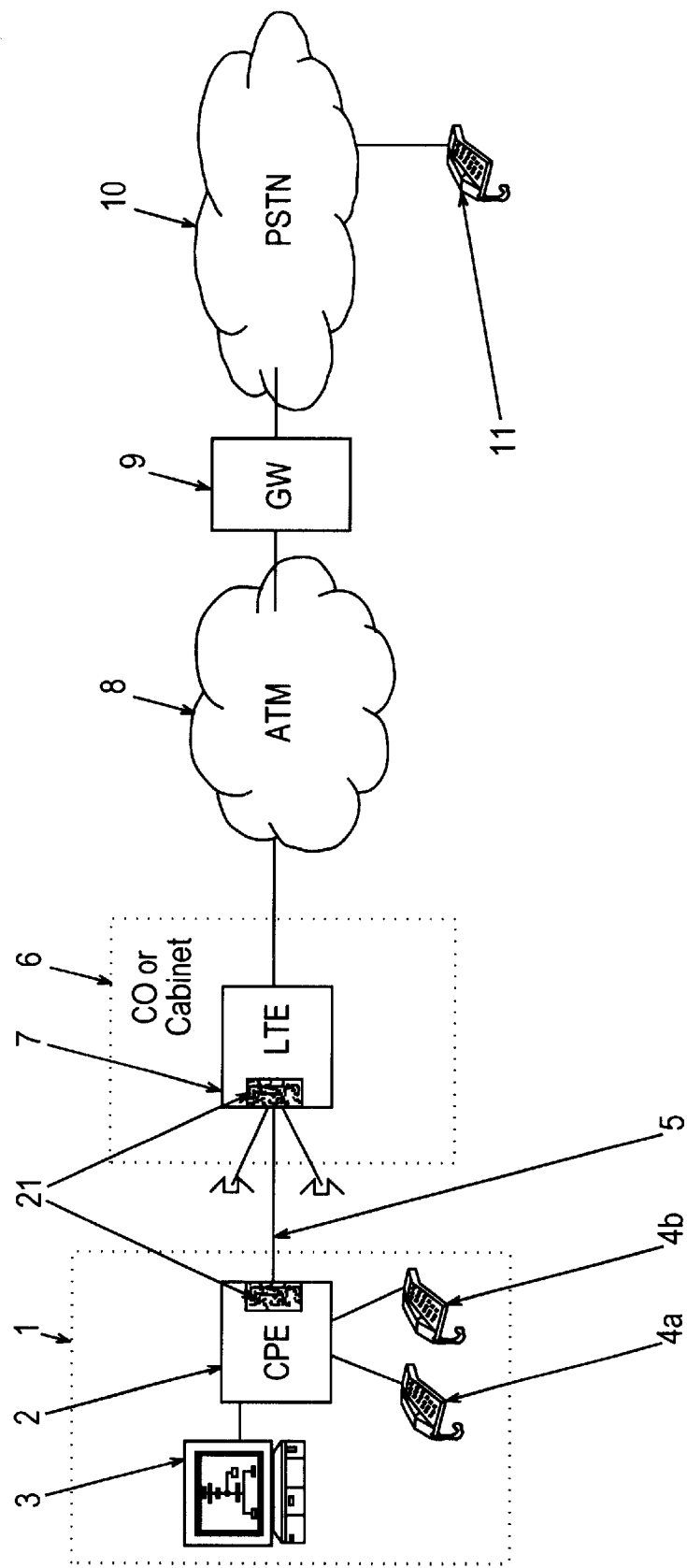
FIG. 1 shows a typical inter-connected network arrangement comprising an xDSL access network.

FIG. 1 shows a typical arrangement in which xDSL is used in a legacy access network 5 to provide multiple voice and data services to network subscribers 1. The legacy access network 5 typically comprises twisted copper pair cables, one pair running from each of a plurality of subscribers 1 to the exchange (central office) or cabinet 6. By installing suitable xDSL Line Terminating Equipment (LTE) 7 at the exchange or cabinet 6 and xDSL Customer Premises Equipment (CPE) 2 at subscriber premises 1, subscribers 1 are able to obtain multiple voice 4 and/or data 3 services over the single twisted copper pair cable or line 5 originally dedicated to them by the network operator.

The subscriber's voice 4 and data 3 channels are typically ATM virtual circuits or packet switched cells which are transferred across the access network 5 using xDSL modems 21 at the CPE 2 and the LTE 7. ATM virtual circuits are formed between the ATM interface or (shown in FIG. 2) gateway 24 or 23 to the subscribers phone 4 or PC 3 respectively and another gateway 9 to for example the Public Switched Telephone Network (PSTN) 10. ATM cells of the virtual circuits are sent across the access network 5 using an xDSL modem 21 which converts the ATM cells into xDSL signals which in turn are interpreted by a corresponding xDSL modem 21 at the exchange LTE 7. The recovered ATM cells are sent on to the virtual circuit termination point at the PSTN gateway 9 for example. Similarly, ATM cells in a virtual circuit terminating in one of the ATM interface to one of the subscriber's communications appliances 3 or 4 are converted into xDSL signals for transmission over the access network 5 from the LTE 7 to the subscriber's CPE 2. In this way, a call may be established between for example one of the subscriber's voice phones 4a and another voice phone 11 on the PSTN 10.

Figure 2:
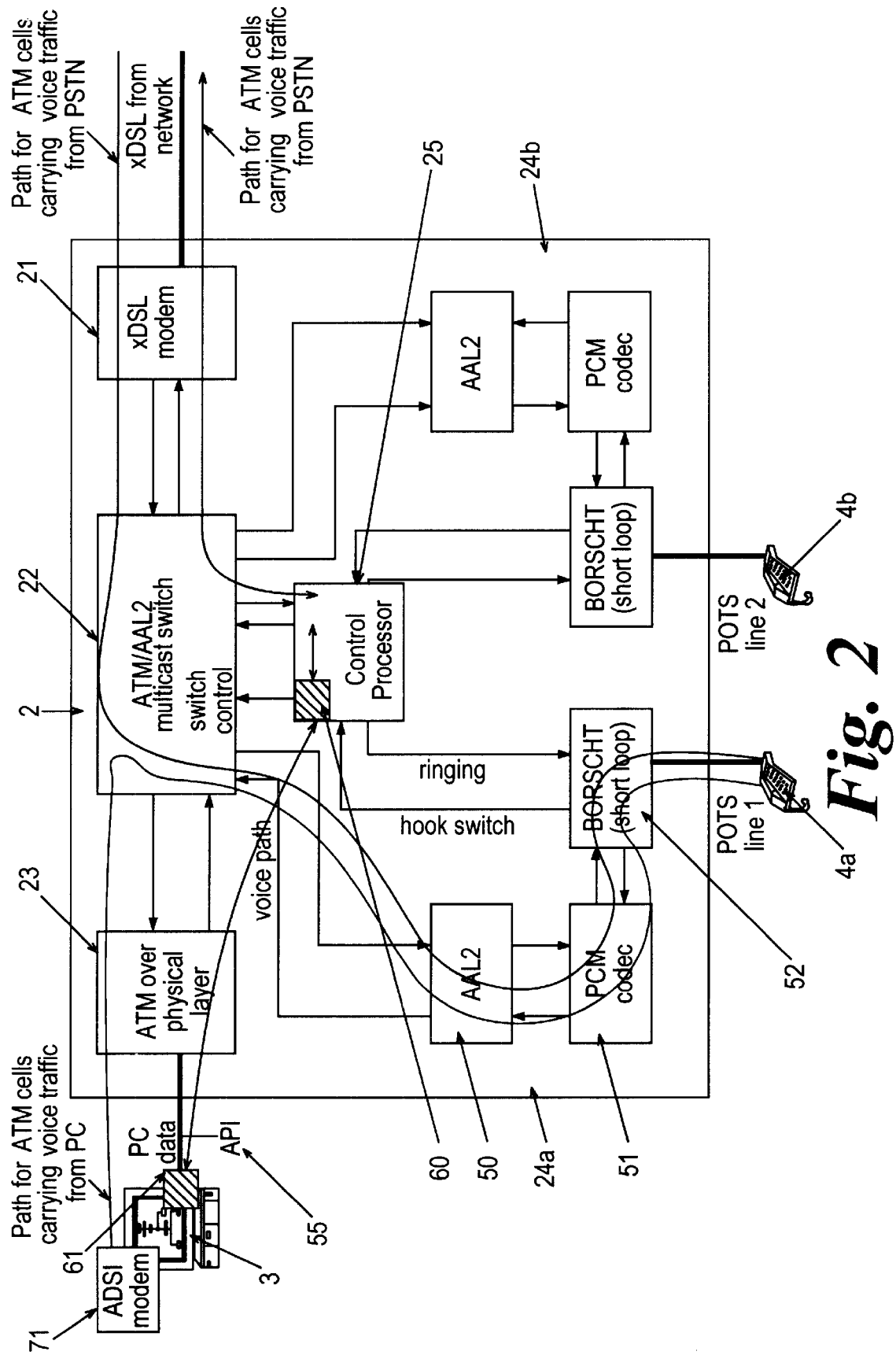
FIG. 2 is a schematic diagram of an internal architecture for VoDSL Customer Premises Equipment (CPE)

FIG. 2 shows an example Voice-over DSL (VoDSL) CPE 2 internal architecture and external connections arrangement. The CPE 2 comprises an xDSL modem 21, an ATM switch 22 which forms part of the internal packet switched network, a controller or control processor 25, two network-telephony or ATM-POTS interfaces 24a and 24b; and a data interface 23 such as an ethernet interface for example. It will be appreciated that FIG. 2 illustrates functional blocks and processes, rather than individual physical components. The control processor function 25 may be implemented on the same physical silicon as other functions in the CPE for example.

The ethernet interface 23 provides for a connection to a subscriber PC 3 and/or other subscriber data appliances such as further PCs or a set-top box. Other data protocols could alternatively be used, for example ATM-25, IEEE 1394 or Universal Serial Bus. As a further alternative, the PC 3 may be directly connected to the ATM network if suitably terminated.

The ATM-POTS interfaces 24a and 24b convert analogue voice and DTMF (Dual Tone Multi-Frequency) dialling signals from the subscriber's voice phones 4a and 4b into ATM cells for a virtual circuit and vice versa. In a preferred arrangement, the ATM-POTS interfaces 24 each comprise an AAL2 transceiver 50, a PCM codec 51, and a Borscht circuit 52. The BORSCHT circuit (Battery, Over-voltage protection, Ringing, Supervision, Coding, Hybrid, Test) is a known function which provides a physical interface to a standard analog telephone handset. In addition to a bi-directional channel carrying voice traffic, the BORSCHT function provides a logical signal 'hook switch' indicating whether the telephone receiver is lifted, and accepts a logical signal 'ringing' to ring the bell (or equivalent alerting device). The BORSCHT circuit also incorporates a PCM codec 51 which generates a sampled digital representation of the user's speech and accepts a sampled digital signal to drive the telephone earpiece.

Because of its relative simplicity and low cost implementation, ATM is the preferred layer 2 or link layer protocol. However other protocols capable of transporting the required information across the network connection, for example Internet Protocol (IP), may also be used. Corresponding POTS interface equipment 24 or gateways and data interface equipment 23 being implemented as required.

Typically, phone calls originating from one of the voice phones 4 will generate DTMF tones indicating the called number. The control processor 25 allocates a virtual circuit between the ATM-POTS interface 24 and the Gateway 9 to the PSTN, the DTMF tones being loaded into ATM cells for transport across the access network 5 via the xDSL modems 21 in the same way as speech samples later in the call. These DTMF tones are interpreted by the telephony switch forming the local interface to the PSTN 10 which routes the call to the requested destination. The request for a virtual circuit through the exchange or cabinet 6 to the gateway 9 is typically identified by recognising a hook switch event at the subscriber's phone 4—that is when the subscriber picks the phone hand piece to dial an external number, an ATM virtual circuit is allocated between the ATM-POTS interface 24 and the gateway 9.

It is a preferred implementation of VoDSL using ATM to encapsulate the information in the AAL2 (ATM Adaptation Layer 2—as defined in ITU-T Recommendation 1.363.2) ATM encapsulation scheme, which allows for an additional level of addressing.

The control processor 25 is arranged to enable and disable virtual circuits by controlling the ATM switch 22. The control processor is also arranged to identify hook switch events on any of the subscriber's phones 4, and additionally receives ringing messages from the exchange and signals the BORSCHT function to provide a ringing signal when appropriate to each of the voice phones 4.

The xDSL modem 21 transmits and receives the ATM cells over the access network 5 using an xDSL physical-layer modulation scheme. Any suitable xDSL technology may be employed, for example HDSL, ADSL, or VDSL.

Functionally, the subscriber's CPE 2 provides high speed data access to a PC for example as well as a number of POTS lines 4a and 4b for example, each with a different number. All data and voice channels are provided over the same twisted pair copper cable 5. While the specific CPE 2 architecture described shows a single high speed data access point and 2 POTS access points 24a and 24b, numerous other combinations are possible including multiple data access points and numerous POTS access points.

VoDSL functionality is advantageous in encouraging subscribers to adopt xDSL technology, as it is a significant improvement over what is available over the previous single POTS channel historically provided or the more recent multiple narrow band ISDN technology. Additionally, where copper access pairs are scarce, and with the increasing demand for more access lines to customer premises, VoDSL allows operators to meet increased demand for high speed data and multiple telephone lines without installing additional copper.

However further functionality is limited by what is provided by the access network operator and/or the information sent with a particular call. For example Caller Line Identification (CLI) information sent with a call may be limited to the caller's phone number only, and can be enhanced with locally (at the customer premises) held information associated with the CLI.

This invention provides a novel method of operating the control processor 25 in order to transfer service messages to provide enhanced services. The method uses computer functionality to communicate with the control processing function 25 of the CPE 2, which controls presentation of the telephone calls at the customer premises, leading to an enhanced and rich set of possible applications and services to enhance the customer premises network. This computer functionality can be contained within the CPE 2, the telephones 4a and 4b, or within the wider area network outside of the customer premises.

In a preferred example, the PC 3 connected to the data interface 23 of the CPE 2 provides the computer functionality. Applications running on the PC 3, communicating with the CPE control processor 25 via an API 55, extend the basic functionality of the CPE 2, which operates in a standard basic mode in the absence of the optional PC software 61.

The enhanced CPE functionality provided supports additional services over and above those supported by the access network operator via the exchange or cabinet 6 and the PSTN 10, and because these services originate from "within" the subscriber's CPE 2 or subscriber premises 1, the subscriber can configure these services and optimise them for his own needs. This additional and customizable functionality significantly improves the "added-value" of voice telephony services provided over the xDSL access network to a subscriber and will therefore contribute strongly to take-up rates by subscriber's of this technology.

In a preferred implementation an inventive CPE 2 architecture is used which comprises an Application Programmers Interface (API) 55 enabling function 60. The API enabling function is associated with the control processor 25 and comprises software adapted for the CPE 2 environment which is adapted to communicate via a predetermined set of messages with a corresponding API enabling function 61 normally resident in the users PC 3. Together the API enabling functions 60 and 61 form an API 55 between the PC 3 and the control processor 25 of the CPE 2 which allows application programmes operating on the PC 3 to interact with the control processor, and provide the subscriber with enhanced services not available on standard VoDSL CPE 2.

The API 55 is preferably enabled using the connection to the data interface 23 and from there an ATM virtual circuit to the control processor 25. Control signals may then be transferred across this path between the PC and the control processor using the protocol adopted by the API enabling functions 60 and 61. The API 55 so formed allows the control processor 25 to communicate call-state and other information to the PC 3, and allows the PC 3 to influence operation of the control processor 25 which in turn configures the ATM/AAL2 switch 22 to create new ATM virtual circuits between the data interface 23, the ATM-POTS interfaces 24 and the control processor 25 depending on the service required.

As an alternative, the API 55 may be implemented over a direct connection between the PC and CPE.

The API 55 (Application Programmers Interface) allows computer functionality, such as an attached PC 3, to exchange information with the control processor 25 in the CPE. This allows optional software in the PC 61 to control "primitive" operations in the CPE 2 to implement a more complex suite of services. In the absence of this software 61 and PC 3 using the API 55, the control processor 25 on the CPE2 implements a standard basic set of functions in presenting the telephone calls.

Some of the services described herein require the use of a multicasting ATM/AAL2 switch 22, and any CPE 2 will require this ATM multicasting ability to provide those services. However the use of an ATM/AAL2 multicasting switch 22 is not essential for all services described herein, so that a standard non-multicasting ATM/AAL2 switch 22 will be adequate for these services.

The use of an ATM/AAL2 multicast switch 22 enables voice traffic and control information to be passed simultaneously to two destinations, for example to the PC 3 as well as to a subscriber phone 4.

The invention provides enhanced services by employing service messages which are transferred between the CPE 2, phones 4, and PC 3 via ATM cells on a virtual circuit connecting one interface 23 or 24 to another such interface 23 or 24 or to the control processor 25. An ATM virtual circuit is contracted between these functional entities 23, 24 or 25 in known manner, the service messages being loaded into ATM cells dedicated to that circuit and switched by the ATM switch 22 to the receiving entity 23, 24 or 25. Preferably the service messages are carried as in-band (i.e. voice-band) traffic.

It will be understood by those skilled in the art that the functional blocks or entities described within the CPE 2 may be implemented in a number of ways and are not restricted to the architecture described.

The PC 3 and at least one of the voice phones 4 are adapted to receive and transmit the service messages to enable additional user functionality.

Preferably the service messages utilise the ADSI ((Analogue Display Services Interface) protocol for transmitting alpha numeric text as published by Bellcore (Telcordia) in December 1993. The ADSI protocol uses an in-band (voice-band) modulated signal to transmit the ADSI messages downstream to the ADSI terminal (such as an ADSI telephone), and DTMF (Dual Tone Multi-Frequency) tones for upstream signalling to an ADSI server. The ADSI protocol includes control messages which allow various functionalities such as switching between data transmission and normal voice transmission in the voice-band.

The ADSI phones 4 utilised comprise a user display panel with associated menu buttons. By using the ADSI phone menu buttons and display, a subscriber 1 can be provided with additional services or functionality in terms of information and control capability as described below. This is achieved by the communication of ADSI service messages from the PC 3 or CPE 2 to ADSI phones 4 and the communication of DTMF tones from the ADSI phones 4 to the PC 3 or CPE 2.

The user of an ADSI phone 4 has available a number of menu button options to request information or control implementation or modify services. The menu options will correspond to text on the display which has been set up by ADSI messaging from the PC 3 for example. The ADSI phone 4 user requests are sent as DTMF tone service messages which are switched by the ATM switch 22 to the PC 3 (or control processor 25), which is configured to respond with the required information control or modification service. Requested information is sent in ADSI format and switched to the user's ADSI phone 4 where it is displayed.

The use of ADSI service messages is advantageous in that the ADSI protocol is well known in the access network field, and consequently is well supported by compatible equipment. In particular ADSI phones are readily available and relatively cheap. Therefore the additional services can be provided to the subscriber 1 at a relatively low cost, and without the need for significant development of purpose built equipment and protocols.

While ADSI service messages and voice phones 4 are preferred, other protocols which provide for the transmission of alpha-numeric text could alternatively be used.

For example including the range of voiceband modem standards such as the ITU-T V-series modem standards referenced in ITU-T Recommendation 8.1, commonly used to facilitate data communication over the telephone network.

The following is a non-exhaustive list of services which can be implemented using the inventive methods described herein:

Enhancement of incoming CLI information with user-specific data

Customer-premises, or domestic, call waiting

E-mail alert and optional re-direction to screen-phone

Diagnosis of modem or CPE state using screen-phone

Configuration of xDSL modem or CPE using screen phone

Display activity status of all CPE-connected equipment on screen-phone point and click dialling from PC address book In order to explain how these services cant be implemented, there follows examples of some sample services and examples of how these are implemented using the invention.

The ADSI messages sent to the ADSI telephone are sent in-band within the voice-traffic part of a call, using an ADSI modem (for example 1200-baud). The duration of the message transfer will depend on the quantity of alphanumeric information to be transferred, but typically this would take less than one second. Preferably, the ADSI modem 71 is implemented in software within the connected PC 3.

The CPE temporarily sets-up a voice path from the PC (which must have a suitable ADSI modem, which is preferably implemented in software) and the ADSI telephone 4 attached to the CPE. This need only be implemented whilst the ADSI message is transferred to the phone. Once the message is finished, the incoming voice traffic path is re-established to the destination telephone.

The control processor 25 of the CPE 2 configures the ATM/AAL2 multicast switch dynamically, as appropriate, to switch in the path from the PC 3 to the ADSI phone 4 for the duration of the ADSI message. This is achieved using messages across the API 55, as discussed above. Alternatively, the AAL2 cell-disassembly function 50 of the voice circuitry in the CPE 24*a* for the ADSI telephone 4*a* can, under control from the control processor 25, prioritise the voice path from the PC for the duration of the ADSI message.

It will be appreciated that it can be left to the discretion of the implementation or optional set up for the system as to whether the ADSI message path from the PC can interrupt the incoming voice-path from the external call in the case where the recipient has picked up the handset at the ADSI telephone. In such an instance, transfer of the ADSI message to the phone would lead to an interruption of the voice call of say 1 second, which might be deemed undesirable.

EXAMPLES OF ADDITIONAL SERVICES PROVIDED FOR

1/ Enhancement of Incoming CLI Information

This service provides enhanced caller line identification information to the user of an ADSI phone 4. This additional information is stored in a database within the PC 3 and is matched with the incoming CLI information contained in the incoming call. The PC 3 sends additional information using ADSI messages to the ADSI phone 4 which corresponds to the incoming CLI.

For example, having identified the CLI information as the number of a friend held in the PC's database, the PC might send to the ADSI screen on the destination telephone 4 the name of the person calling, and other information such as a reminder that the user has a lunch appointment the following day with the caller. Different types of information can be transferred within the ADSI message, to give a rich presentation associated with the call. For example, the PC might send information about a birthday of the caller that the recipient has missed, or information about the last time the recipient called the caller ("you last called Joe 12 weeks ago!").

Figure 3:
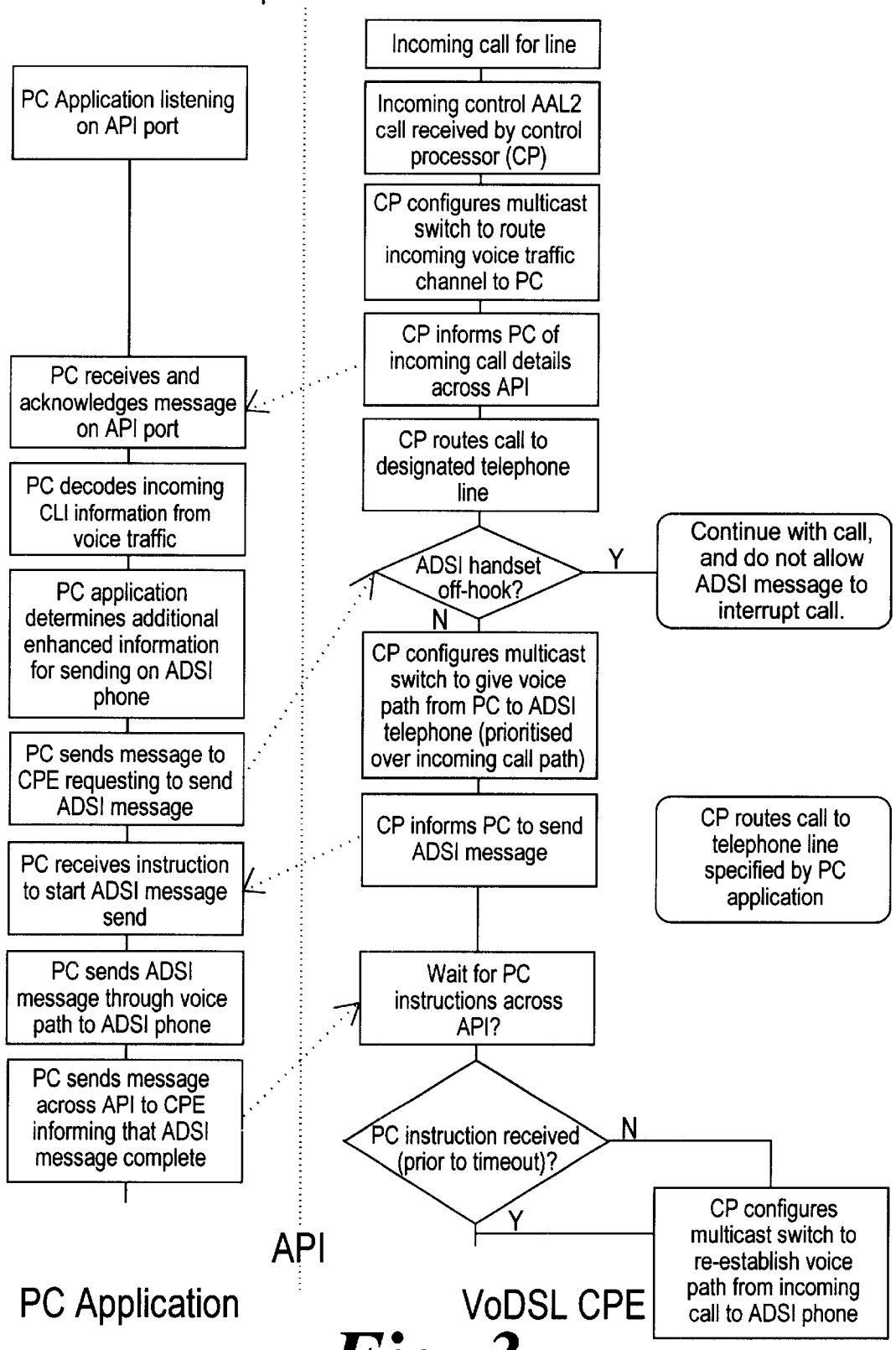
FIG. 3 is a flow diagram for an enhanced Caller Line ID (CLI) service.

FIG. 3 shows an example algorithm for implementing this service. Referring to this figure and FIG. 2, upon receipt of an incoming call for one of the ADSI phones 4, the incoming AAL2 control cell is received by the control processor 25. The control processor 25, recognising an incoming voice call, configures the multicast ATM switch 22 to route the incoming voice traffic channel to the PC 3 as well as the receiving ADSI phone 4. The control processor also informs the PC 3 of the incoming call details across the API. The PC receives and acknowledges this message on the API port and awaits the incoming call, decoding the incoming CLI information from the voice traffic channel (preferably using software)

The PC then determines any additional enhanced information it may have corresponding to the incoming CLI for sending to the ADSI phone 4. Meanwhile, if the ADSI phone handset has been lifted, the call is continued and the control processor 25 does not allow any ADSI message from the PC to interrupt the call. This however is just one way of configuring the system to handle this particular event. It may be acceptable for a brief drop in the voice call, during which time the ADSI message from the PC is transferred to the ADSI phone 4. The particular configuration used is dependent on user preferences and can be set-up as desired.

If the ADSI phone handset has not been lifted, or the user has deemed it acceptable (through an option during configuration of the CPE) for a brief break in the call, the PC sends a message to the control processor 25 requesting to send an ADSI message. The control processor 25 then configures the multicast ATM switch 22 to provide a voice path or virtual circuit from the PC 3 to the ADSI telephone 4, prioritised over the incoming voice call path. The control processor then informs the PC 3 to send its ADSI message. The PC 3 receives this instruction over the API 55 and sends the ADSI message through the newly created virtual circuit to the ADSI phone 4. The ADSI phones receives this message and displays the enhanced CLI information on its display screen. The PC 3 sends a message across the API 55 to the control processor 25 informing that the ADSI message is complete. Meanwhile the control processor 25 awaits instructions from the PC 3 across the API 55. Upon receiving a message complete instruction the control processor 25 reconfigures the multicast switch 22 to re-establish the voice path from the incoming call to the ADSI phone 4. The control processor 25 is preferably configured to include a time-out, such that the multicast switch re-establishes the voice path from the incoming call if a message complete message is not received over the API 55 from the PC 3 within a predetermined time.

It should be noted that this service requires the use of a multicasting ATM/AAL2 switch 22.

2/ Customer Premises, or Domestic, Call Waiting

This service provides internal calling between phones connected to the CPE 2, as well as call waiting. This service requires a DTMF detection, interpretation and relay function which is preferably implemented within the PC. The control processor 25 of the CPE 2 communicates with the PC 3 across the API 55. The DTMF function determines the number called, and where it corresponds to an external PSTN number, relay (or re transmit) the DTMF data to the external network. This is achieved by communication between the phone 4 and the control processor 25 of the CPE 2 to set up the required traffic paths from the DTMF function, through the ATM switch 22, and to the external network.

Where the call corresponds to an internal call to another telephone connected to the CPE 2, the control processor 25 sets up (under instruction from the PC 3 across the API 55) the internal call through the ATM switch 22

Note that this service does not require a multicasting switch 22, but that the following enhancement does.

This service is preferably enhanced by an internal call waiting service that is enabled by ADSI messaging. Where the called party is on another call (e.g. to the external network), the PC could request through the API 55 a temporary voice-path channel through the multicast ATM switch 22 to the called party's ADSI telephone (for example 4a), which would be configured by the control processor 25. This is for the duration of an ADSI message being sent to the phone, which causes an interruption to the call in progress. The information that could be carried to the ADSI phone 4 in this instance might be the details of the internal party trying to make the call for example.

3/ E-Mail Alert

This service informs a subscriber via the ADSI phone 4 display panel that an email has arrived at the user's PC 3. Upon receipt of a new email message, the PC 3 is configured to generate an ADSI service message which is switched through the ATM switch 22 to the subscriber's ADSI phones 4, which then displays an appropriate message on the ADSI phone display panel. The service may be extended to display additional information such as how many unread emails are currently on the PC 3, and whom they are from.

When an e-mail arrives at the PC 3 the PC 3 is configured to request (with a message across the API 55) a voice-path connection to the ADSI telephone 4, which is configured through the ATM/AAL2 multicast switch 22 by the control processor 25 of the CPE 2. The PC 3 then sends the ADSI message to the ADSI telephone 4, as described above, which might include information about the e-mail, its sender, etc.

Figure 4:
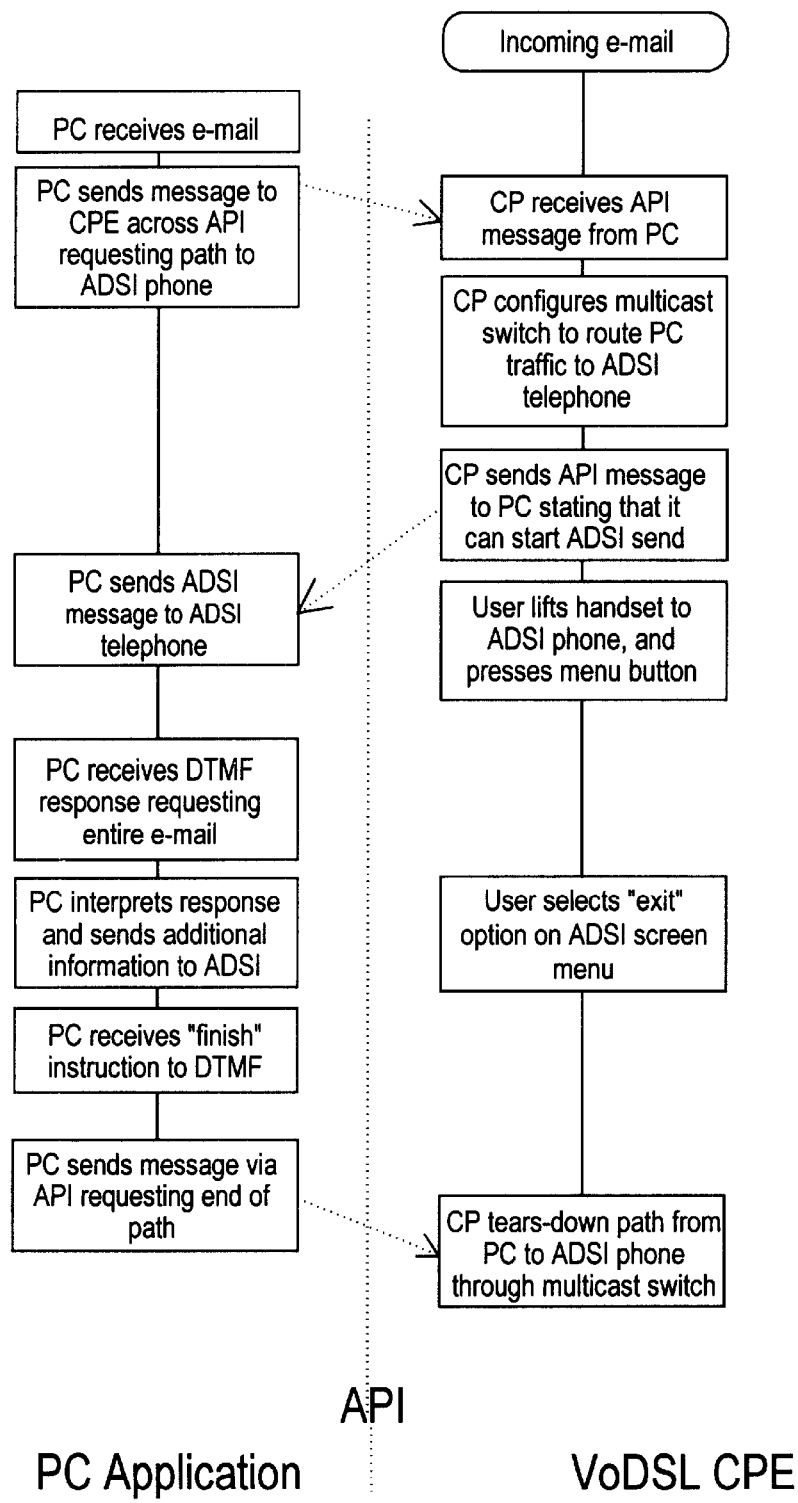
FIG. 4 is a flow diagram for an e-mail notification service.

FIG. 4 shows flow diagram for an example e-mail alert algorithm. Referring to FIGS. 2 and 4, an incoming e-mail is routed through the ATM switch 22 by the control processor 25 to the PC 3 in known manner. The PC 3 sends a message to the CPE 2 across the API 55, requesting a virtual circuit to a predetermined ADSI phone. The control processor 25 receives this message via the API 55 and configures the ATM switch 22 to route PC 3 traffic to the designated ADSI phone 4. The control processor 25 then sends an API message to the PC 3 advising it to start the ADSI send. The PC 3 receives this message and then sends an ADSI message ADSI telephone 4. The ADSI phone receives this message and displays its content on its screen display indicating that the PC has received a new e-mail.

The system may be configured to provide the ADSI phone user with a number of user options such as display the e-mail for example. The ADSI phone 4 may therefore be configured to present a menu of options associated with control buttons on the ADSI phone following the user lifting the handset.

The ADSI phone generates DTMF tones in response to menu selections as is known. These tones are routed to the PC 3 via the virtual circuit through the ATM switch. The PC decodes these tones using a DTMF receiver and decoder. Preferably this is implemented in software. The PC then interprets the user's request and sends additional information or otherwise provides the service requested by the ADSI phone user. These services are provided by ADSI service messages sent via the ATM virtual circuit. Additionally or alternatively, services involving the CPE 2 itself, may be implemented via instructions from the PC 3 to the control processor 25 using the API interface 55.

When the PC 3 receives a "finish" or "exit" instruction by DTMF from the ADSI phone user, the PC sends instructions via the API interface requesting tear-down of the virtual circuit or path. Upon receipt of these instructions, the control processor 25 tears down the virtual circuit or path from the PC 3 to the ADSI phone 4 through the ATM switch 22.

It should be noted that to implement this service, the PC 3 must be implemented with a DTMF receiver and decoder, which is preferably implemented in software.

It should also be noted that this services does not require the use of a multicast ATM switch 22, a non-multicasting ATM switch being adequate.

4/ Modem State Diagnosis Through ADSI Telephone

This is an application that uses an ADSI telephone to access and display diagnostic information on the state of the xDSL modem or CPE.

Figure 5:
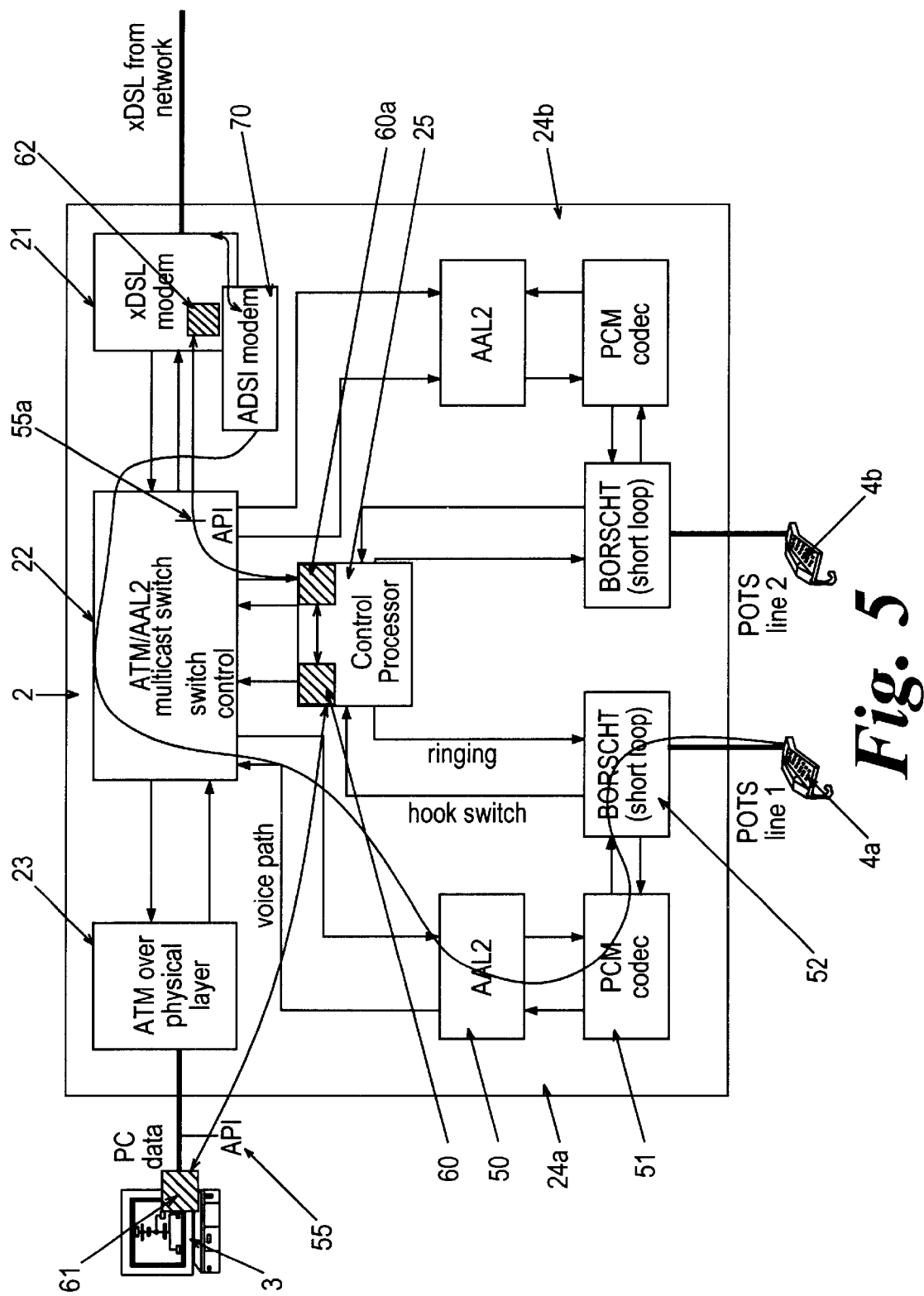
FIG. 5 is a schematic diagram of an internal architecture for VoDSL CPE arranged to provide services such as modem state diagnosis and CPE internal activity status.

Referring to FIG. 5, an ADSI modem 70 is implemented within the CPE 2, which is preferably under the control of the xDSL modem 21or the control processor 25. The control processor 25 sets up a voice-path from the ADSI modem 70, through the 40 ATM switch 22, to the ADSI telephone for example 4a.

This service requires a suitable API 55a between the XDSL modem 21 and the control processor 25, and a path for transferring messages to be ADSI encoded between the xDSL modem 21 and the ADSI modem 70.

5/ Internal Activity Status

ADSI messages can be sent by the PC, using a method similar to example 3, to the ADSI telephone 4 to display information about the status of equipment connected to the CPE 2. This might include incoming FAX, telephones off-hook, etc.

The control processor 25 logs the status of all the equipment connected to the CPE 2, and instructs the PC 3 using messages across the API 55 to send the appropriate ADSI messages to the ADSI telephone 4. The control processor configures the multicast switch 22 to establish a path from the ADSI modem in the PC 3 to the ADSI telephone, and forwards internet activity status information using ADSI service messages.

The above implementation assumes that the ADSI modem is in the PC 3, but of course this invention is not limited to this case, as the ADSI modem could be in the CPE 2. Placing the ADSI modem function within the PC 3 is, however, preferable as this reduces the cost of the CPE 2.

As described above, in the preferred embodiment the computer functionality that provides these services is implemented within the users PC 3. This is advantageous as it allows the internal architecture including the processing and storage capabilities of the CPE 2 to remain at a relatively low level such that a standard VoDSL CPE with additional programming can be utilised to implement the invention. This is advantageous in keeping the CPE 2 equipment cheap, in that there is no need to design additional capability into the CPE 2 to implement the services. The preferred arrangement also allows the user to implement new services by simply upgrading the applications on the PC 3. These advantages provide a cost effective and readily upgradeable set of enhanced services that can be easily configured to meet the users personal needs. It also allows for the development of additional services not described above which are easily implemented with new software applications loaded onto the users PC 3.

While the preferred embodiment uses the available computing power of the users PC 3, these services could alternatively be implemented using the CPE 2 above, the CPE 2 being enhanced with additional processing and storage capacity plus programming, as well as a DTMF modem when required for user interactive services.

In a yet further alternative, the processing and storage capacity plus programming required is distributed between the PC 3 and CPE 2 leaving the CPE 2 with a basic set of services for example, in the event the PC 3 becomes disconnected from the CPE 2 or is switched off. Further this PC functionality may be further distributed for example to the exchange 6 or to an "on-line" remote computer.

While the invention has been described with reference to a VoDSL system, other digital access systems (DAS) can alternatively be used—for example optical, E1, and data modem over coax as in cable TV.

The foregoing describes the invention including preferred embodiments thereof. Alternations and modifications as would be obvious to those skilled in the art are intended to be incorporated within the scope hereof.

What is claimed is:

1. Digital Access System (DAS) Customer Premises Equipment (CPE) comprising:
    an internal packet switched network comprising a switch;
    a DAS modem connected to said internal network and arranged such that in use the internal network is coupled to an external packet switched network by a DAS link over an access network;
    a network-telephony interface connected to said internal network and coupled to a customer premises telephony appliance;
    a network-data interface connected to said internal network and coupled to a customer premises data appliance;
    a controller arranged to control said switch in order to establish packet transfer paths between said modem and said interfaces to complete calls between said appliances and entities on the external network;
    and means for transferring service messages across said internal network between said interfaces, said controller and said modem.

2. A CPE as claimed in claim 1, wherein said DAS is Voice over Digital Subscriber Line (VoDSL).

3. A CPE as claimed in claim 2 wherein said means for transferring service messages comprises means for transferring control and information signals between said controller and a computing function in order to adapt the controller to provide alternative packet transfer paths for said service messages.

4. A CPE as claimed in claim 3, wherein said means for transferring control and information signals comprises an application programmers interface enabling function corresponding to an application programmers interface enabling function in said computer function which together form an application programmers interface (API) between said means for transferring control and said computer function over which said signals are transferred.

5. A CPE as claimed in claim 4, wherein said CPE comprises said computing function.

6. A CPE as claimed in claim 4, wherein said computing function is external to said CPE.

7. A CPE as claimed in claim 6, wherein said computing function is associated with a Personal Computer connected to said network-data interface.

8. A CPE as claimed in claim 7, wherein said API is formed across said interface.

9. A CPE as claimed in claim 2, wherein said switch is a multicasting switch.

10. A CPE as claimed in claim 2, wherein said internal network is an ATM network.

11. A CPE as claimed in claim 2, wherein said data appliance comprises a Personal Computer.

12. A CPE as claimed in claim 1 wherein said service messages comprise text messages and control signals according to the ADSI specification.

13. A CPE as claimed in claim 12, wherein said telephony appliance comprises an ADSI telephone.

14. A system comprising a DAS CPE, a customer premises data appliance connected to said CPE, a customer premises telephony appliance connected to said CPE, wherein said CPE is connected in use to an access network, and wherein said DAS comprises:
    an internal packet switched network comprising a switch;
    a DAS modem connected to said internal network and arranged such that in use the internal network is coupled to an external packet switched network by a DAS link over said access network;
    a network-telephony interface connected to said internal network and coupled to said customer premises telephony appliance;
    a network-data interface connected to said internal network and coupled to said customer premises data appliance;
    a controller arranged to control said switch in order to establish packet transfer paths between said modem and said interfaces to complete calls between said appliances and entities on the external network;
    and means for transferring service messages across said internal network between said interfaces, said controller and said modem.

15. A system as claimed in claim 14, wherein said DAS is VoDSL.

16. A system as claimed in claim 15 wherein said means comprises means for transferring control and information signals between said controller and a computing function in order to adapt the controller to provide alternative packet transfer paths for said service messages.

17. A system as claimed in claim 16 wherein said service messages comprise text messages and control signals according to the ADSI specification.

18. A system as claimed in claim 17, wherein said telephony appliance comprises an ADSI telephone.

19. A method of operating a VoDSL CPE to provide enhanced calling line identifier information, said CPE comprising:
    an internal packet switched network comprising a switch;
    a DSL modem connected to said internal network and arranged such that in use the internal network is coupled to an external packet switched network by a DSL link over an access network;

a network-telephony interface connected to said internal network and coupled to a customer premises telephony appliance;

a network-data interface connected to said internal network and coupled to a customer premises data appliance;

a controller arranged to control said switch in order to establish packet transfer paths between said modem and said interfaces to complete calls between said appliances and entities on the external network;

and means for transferring service messages across said internal network between said interfaces, said controller and said modem said method comprising:

receiving an incoming call for said telephony appliance;

receiving incoming caller identity information from said call;

routing said information to said data appliance;

receiving service messages from said appliance which contain enhanced calling line identifier information;

forwarding said service messages to said telephony appliance in order to display said enhanced information to a user of said appliance.

20. A method of operating a VoDSL CPE to provide internal calling services, said CPE comprising:

an internal packet switched network comprising a switch;

a DSL modem connected to said internal network and arranged such that in use the internal network is coupled to an external packet switched network by a DSL ink over an access network;

a first and second network-telephony interface connected to said internal network and coupled to a first and second customer premises telephony appliance respectively;

a network-data interface connected to said internal network and coupled to a customer premises data appliance;

a controller arranged to control said switch in order to establish packet transfer paths between said modem and said interfaces to complete calls between said appliances and entities on the external network; and means for transferring service messages across said internal network between said interfaces, said controller and said modem;

said method comprising:

receiving an outgoing call from said first telephony appliance;

determining whether the called party is said second telephony appliance;

routing said call to said second telephony appliance.

21. A method as claimed in claim 20 further comprising:

determining whether said second telephony appliance is engaged in another call;

forwarding a service message to said second telephony appliance indicating that said first telephony appliance is calling.

22. A method of operating a VoDSL CPE to provide an e-mail alert service, said CPE comprising:

an internal packet switched network comprising a switch;

a DSL modem connected to said internal network and arranged such that in use the internal network is coupled to an external packet switched network by a DSL link over an access network;

a network-telephony interface connected to said internal network and coupled to a customer premises telephony appliance;

a network-data interface connected to said internal network and coupled to a customer premises data appliance;

a controller arranged to control said switch in order to establish packet transfer paths between said modem and said interfaces to complete calls between said appliances and entities on the external network;

and means for transferring service messages across said internal network between said interfaces, said controller and said modem;

said method comprising: receiving service messages from said data appliance which contain an indication that said appliance has received an email;

forwarding said service messages to said telephony appliance in order to display said indication to a user of said appliance.

23. A method of operating a VoDSL CPE to provide a modem state diagnosis service, said CPE comprising:

an internal packet switched network comprising a switch;

a DSL modem connected to said internal network and arranged such that in use the internal network is coupled to an external packet switched network by a DSL link over an access network;

a network-telephony interface connected to said internal network and coupled to a customer premises telephony appliance;

a network-data interface connected to said internal network and coupled to a customer premises data appliance;

a controller arranged to control said switch in order to establish packet transfer paths between said modem and said interfaces to complete calls between said appliances and entities on the external network;

and means for transferring service messages across said internal network between said interfaces, said controller and said modem;

said method comprising:

receiving service messages from said appliances which contain modem state information requests and forwarding said messages to said modem;

receiving service messages from said modem which contain modem state information and forwarding to said appliances.

24. A method as claimed in claim 23 further comprising:

receiving service messages from appliances which contain control instructions for said modem and forwarding said messages to said modem.

* * * * *